(12) United States Patent
Fossum et al.

(10) Patent No.: US 7,542,044 B2
(45) Date of Patent: *Jun. 2, 2009

(54) OPTIMIZED SPECULAR HIGHLIGHT GENERATION

(75) Inventors: Gordon Clyde Fossum, Austin, TX (US); Stephen Joseph Schwinn, Lakeville, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/049,319

(22) Filed: Mar. 15, 2008

(65) Prior Publication Data

US 2008/0158228 A1    Jul. 3, 2008

Related U.S. Application Data

(63) Continuation of application No. 11/032,240, filed on Jan. 10, 2005.

(51) Int. Cl.
  *G06T 1/00* (2006.01)
(52) U.S. Cl. .................. 345/522; 345/426; 345/589
(58) Field of Classification Search .............. 708/200; 713/300
  See application file for complete search history.

(56) References Cited

U.S. PATENT DOCUMENTS 7,143,126 B2 * 11/2006 Fossum et al. ............ 708/277

2004/0172565 A1 * 9/2004 Oshima et al. ............ 713/300
2005/0004958 A1 * 1/2005 Contini et al. ............ 708/200

OTHER PUBLICATIONS

NA900814, IBM Technical Disclosure Bulletin, Aug. 1990, US, "Simple Way to Generate Unusual Specular Reflections," vol. 33, Issue 3A, pp. 14-15.*
Apple Inc. Mac OS X Assembler Reference: PowerPC Assembler Instructions, 2003.*
Apple Inc., Mac OS X Assembler Reference: PowerPC Assembler Instructions, 2003.

* cited by examiner

*Primary Examiner*—Xiao M Wu
*Assistant Examiner*—Phi Hoang
(74) *Attorney, Agent, or Firm*—Van Leeuwen & Van Leeuwen; Matthew B. Talpis (57) ABSTRACT

An approach to optimize specular highlight generation is presented. A single microprocessor instruction is used to generate an intensity value based upon a viewing angle value. An application stores a viewing angle value in an input register. When called, the "intensity instruction" retrieves the viewing angle value from the input register, and calculates an intensity value using three distinct steps. In turn, the intensity instruction stores the intensity value in an output register for the application to retrieve and further process. In one embodiment, the invention may be implemented using PowerPC™ assembly and VMX™ or Altivec™ instructions. In this embodiment, the intensity instruction may be represented as a "vspecefp" instruction, which stands for a "vector specular estimate floating point" instruction.

9 Claims, 8 Drawing Sheets

OPTIMIZED SPECULAR HIGHLIGHT GENERATION

RELATED APPLICATIONS

This application is a continuation application of co-pending U.S. Non-Provisional patent application Ser. No. 11/032,240, entitled "System and Method for Optimized Specular Highlight Generation," filed on Jan. 10, 2005.

BACKGROUND OF THE INVENTION

1. Technical Field

The present invention relates in general to a system and method for optimized specular highlight generation. More particularly, the present invention relates to a system and method for generating a specular highlight intensity value using a single microprocessor instruction command.

2. Description of the Related Art

Specular highlights are used in 3D graphics to simulate the reflection of a light source on a surface. In typical real time 3D graphics software such as a video game, several estimation algorithms are used to simulate these highlights in a high-speed manner, without using more calculation intensive operations, such as ray tracing. To produce these specular highlights, the rate at which the highlight fades from its lightest color in the center to the darkest outer portion is calculated by the formula:

$$\text{Intensity} = \exp 2(k * \log 2(\cos(\theta)))$$

Where k is a property of the surface (a higher number corresponding to a smoother surface) and theta is an angle between a ray that connects the surface with a viewing position, and a ray that represents the reflection off the surface from a light source, sometimes referred to as a "viewing angle."

This intensity value is typically calculated with several microprocessor instructions, which are a base 2 logarithm instruction, a multiply-add instruction, and a power of 2 exponentiation instruction. These three instructions are typically executed in a vector floating point pipeline, which has some common components to facilitate log, power, multiply and add instructions.

A challenge found with existing art is that, when each instruction executes, a significant portion of the floating-point pipeline is unused for each instruction. The base 2 logarithm instruction completes its result calculation very quickly, in time to pass through a leading zero anticipator and adder without any changes. The multiply-add instruction only adds zero during an intensity value calculation, thereby making the add step unneeded. The power of two instruction performs a fraction calculation near the end of the pipeline since it needs an integer and fraction portion from an aligner. Therefore, the time that is normally spent performing a multiply in other instructions is wasted with the power of two instruction.

Another challenge found with existing art is register dependency. Using a series of instructions, the result of the log instruction must be present before the multiply instruction starts, and the result of the multiply instruction must be present before the power of two instruction starts. Therefore, the instructions must be executed in order and their target registers cannot be overwritten between instructions. In some architectures, "new" instructions may stall until a result with a dependency is completed. This may have a significant impact on performance.

What is needed, therefore, is a system and method for calculating specular highlights in a more efficient and effective manner than what exists in the prior art.

SUMMARY

It has been discovered that the aforementioned challenges are resolved using a single microprocessor instruction that is optimized to generate an intensity value based upon a viewing angle cosine value. An application stores a viewing angle cosine value in an input register. When called, an "intensity instruction" retrieves the viewing angle cosine value from the input register, and calculates an intensity value using three distinct steps. In turn, the intensity instruction stores the intensity value in an output register for the application to retrieve and further process.

An application calculates a viewing angle cosine value using an approach that is known in the art, and stores the viewing angle cosine value in an input register. For example, one approach to compute a viewing angle cosine value is to compute a reflection ray from a light source, bouncing the reflection ray off of a subject point on a surface, and then computing a $\cos(\theta)$ as a dot product of the reflection ray and a ray from the subject point to a viewing position. In another example, which is quicker and more widely accepted in the industry, is to compute a "half-angle" ray, which is the sum of a normalized ray to a light source plus a normalized ray to a viewing position. In this example, the dot product is computed between the half-angle ray and the normal to a surface point on an object. The dot product is the calculated viewing angle cosine value. As one skilled in the art can appreciate, inputs to dot products are vectors of unit length.

An intensity instruction performs a logarithm step by retrieving the viewing angle cosine value from the input register, subtracting out a bias from the viewing angle cosine value's exponent, calculating a log of the viewing angle cosine value's fractional portion using a look-up table, and combining the unbiased exponent and the log fraction value. The sign bit of the result of the logarithm step is determined by analyzing the most significant bit of the unbiased exponent field of the input to the logarithm step. If the sign bit is negative, a two's compliment is performed on the combined unbiased exponent/log fraction value.

The intensity instruction proceeds to perform a multiplication step by multiplying the combined result from the logarithm step with a surface property mantissa, and shifting the result to the left by the amount of the surface property exponent. The sign bit of the result of the multiply operation is determined by performing an exclusive or of the sign bits of the two multiplicands. If either one (but not both) of the sign bits of the result of the logarithm operation and the surface constant (k) are "1", the sign bit of the multiplication step is "1".

The intensity instruction performs a power of two step by rebiasing the integer portion of multiplication step result, performing a power of 2 calculation with the fractional portion of the multiplication step result, and combining the biased integer with the power of 2 calculated fraction. This combination is then stored in an output register for an application to retrieve and further process.

When comparing the intensity instruction with the prior art, it can be seen that two full normalize steps, an addition step, and register storing steps are removed using the invention described herein. In one embodiment, the invention may be implemented using PowerPC™ assembly and VMX™ or Altivec™ instructions. In this embodiment, the intensity instruction may be represented as a "vspecefp" instruction, which stands for a "vector specular estimate floating point" instruction. As one skilled in the art can appreciate, an optimized intensity instruction may be generated using other instruction types and assembly types.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1A:
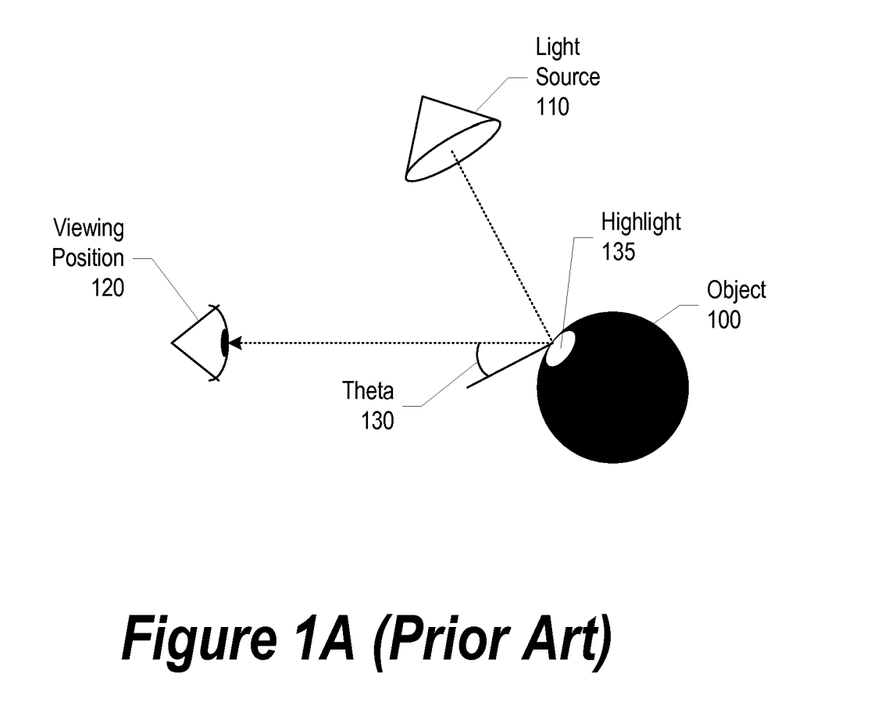
FIG. 1A is a diagram showing a viewing angle cosine that is based upon a viewing position, a light source, and an object.

FIG. 1A is a diagram showing a specular highlight that is based upon a viewing position, a light source, and an object. Specular highlights are used in 3D graphics to simulate the reflection of a light source on a surface. In typical real time 3D graphics software, such as a video game, several estimation algorithms are used to simulate these highlights. To produce specular highlights, an intensity value may be calculated using the formula:

Intensity=exp2($k$*log 2(Cos($\theta$)))

FIG. 1A shows that theta 130 (i.e. $\theta$) is the angle between the ray connecting object 100's surface and viewing position 120, and the ray representing the reflection off object 100's surface (e.g., highlight 135) from light source 110. "K" is a surface property constant of object 100 (a higher k number corresponds to a smoother surface). The above formula produces intensity values whereby specular highlights fade from their lightest shade in the center of highlight 135 to their darkest shade at the outer portion of highlight 135. Prior art uses three microprocessor instruction commands in order to generate an intensity value using the above formula (see FIG. 1B and corresponding text for further details regarding the three microprocessor instruction commands).

Figure 1B:
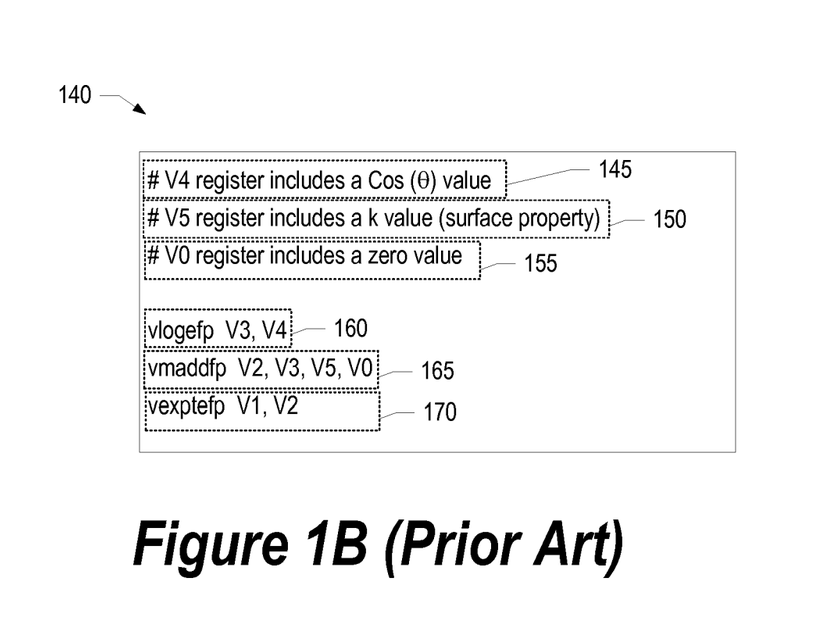
FIG. 1B is a diagram showing three microprocessor instruction commands that are used in prior art to calculate an intensity value based upon a viewing angle cosine value.

FIG. 1B is a diagram showing three microprocessor instruction commands that are used in prior art to calculate an intensity value based upon a viewing angle value. The three microprocessor instruction commands are typically a base 2 log instruction (line 160), a multiply instruction (line 165), and a power of 2 instruction (line 170). The example shown in FIG. 1B represent VMX™ or Altivec™ instructions with PowerPC™ assembly. As those skilled in the art can appreciate, other multiple instruction types may be used to compute an intensity value.

Window 140 includes an example of software code that may be used to calculate an intensity value based upon a viewing angle value. Lines 145 through 155 that describe particular variables that are used in lines 160 through 170 during the intensity value calculations. Line 145 describes that register "V4" includes a cos($\theta$) value, which is referred to in this application as a "viewing angle value." The viewing angle value is used in the base 2 log instruction that is shown in line 160. Line 150 describes that register "V5" includes a "k" value, which is referred to in this application as a "surface property value." The surface property value of a surface is used in the multiply instruction that is shown in line 165. Line 155 describes that register "V0" includes a zero value, which is also used in the multiply instruction that is shown in line 165. A more detailed explanation of the components of the three microprocessor instructions is shown in FIG. 2.

Figure 2:
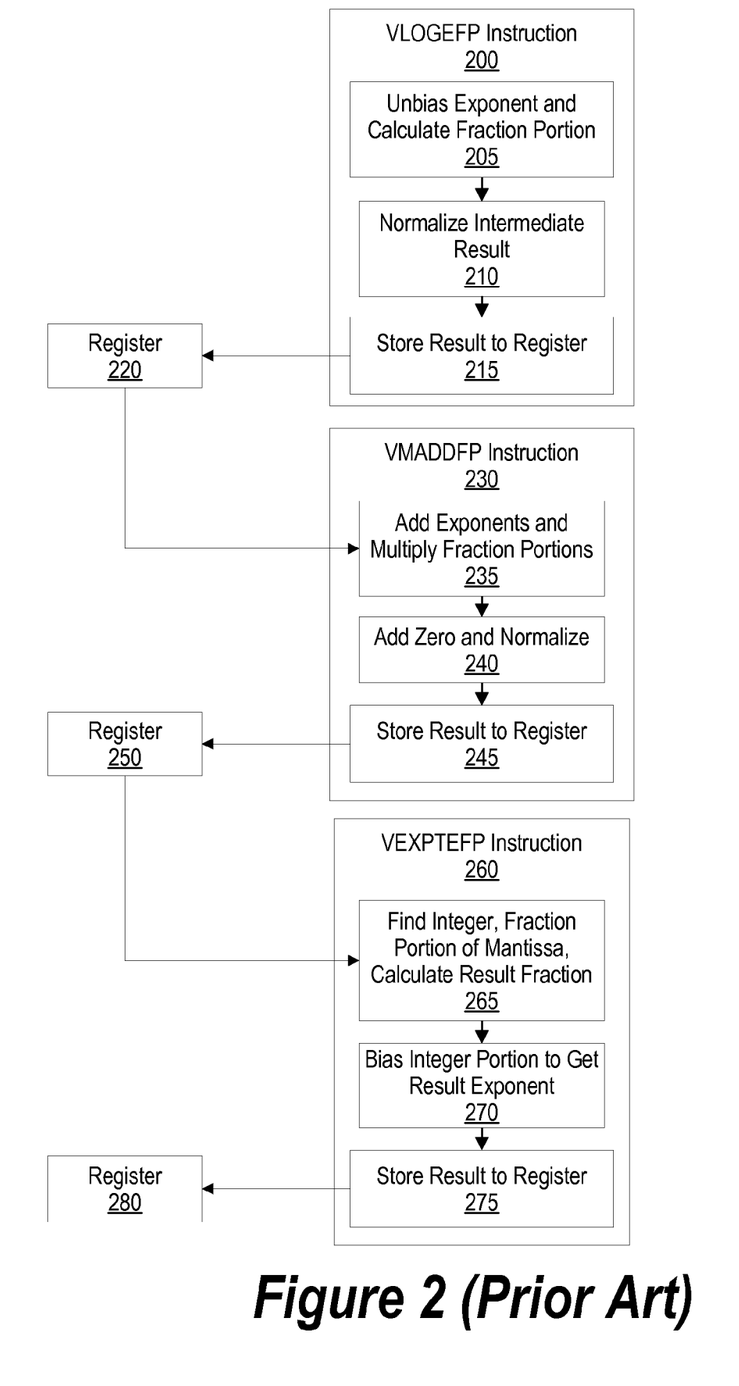
FIG. 2 is a diagram showing component details of three instruction commands that are used in prior art to calculate an intensity result that is based upon a viewing angle cosine.

FIG. 2 is a diagram showing component details of three microprocessor instruction commands that are used in prior art to calculate an intensity value that is based upon a viewing angle value. FIG. 2 shows instructions VLOGEFP 200, VMADDFP 230, and VEXPTEFP 260, which correspond to lines 160, 165, and 170 in FIG. 1, respectively. The three instructions represent VMX™ or Altivec™ instructions with PowerPC™ assembly. As those skilled in the art can appreciate, other multiple instruction types may be used to compute an intensity value.

VLOGEFP 200 includes steps 205 through 215, which perform a base 2 log instruction. Performing a base 2 logarithm calculation includes unbiasing a viewing angle value exponent and calculating the fractional portion of a viewing angle value with a lookup table (step 205). Next, the result from step 205 is normalized at step 210. The normalized result is stored in register 220 at step 215. Since the multiply instruction (VMADDFP 230) is dependent upon the result in register 220, the base 2 logarithm instruction may stall the entire pipeline until it stores the normalized value in register 220.

Performing a multiply instruction (i.e. VMADDFP 230) involves adding the exponents of a surface property value and the normalized result that is stored in register 220 and multiplying the fraction portions of the surface property value and the normalized result that is stored in register 220 (step 235). Zero is added to the result from step 235, and then normalized (step 240). The result from step 240 is stored in register 250 at step 245. As can be seen, the multiply instruction may also stall the pipeline since the power of two instruction (VEXPTEFP 260) depends upon the multiply instruction's result. In one embodiment, register 220 and register 250 may be the same register.

Performing a power of two estimation instruction (i.e. VEXPTEFP 260 involves identifying register 250's integer and fractional portion of the mantissa, and retrieving fractional bits from a lookup table based upon the fractional portion of the mantissa (step 265). Then, the integer portion is biased and treated as a "result" exponent (step 270). The final result is then stored in register 280 at step 275. In one embodiment, registers 220, 250, and 280 may be the same register. A vector floating point pipeline is typically used in the prior art to execute each of the instructions that is shown in FIG. 2 (see FIG. 3 and corresponding text for further details regarding vector floating point pipeline details).

Figure 3:
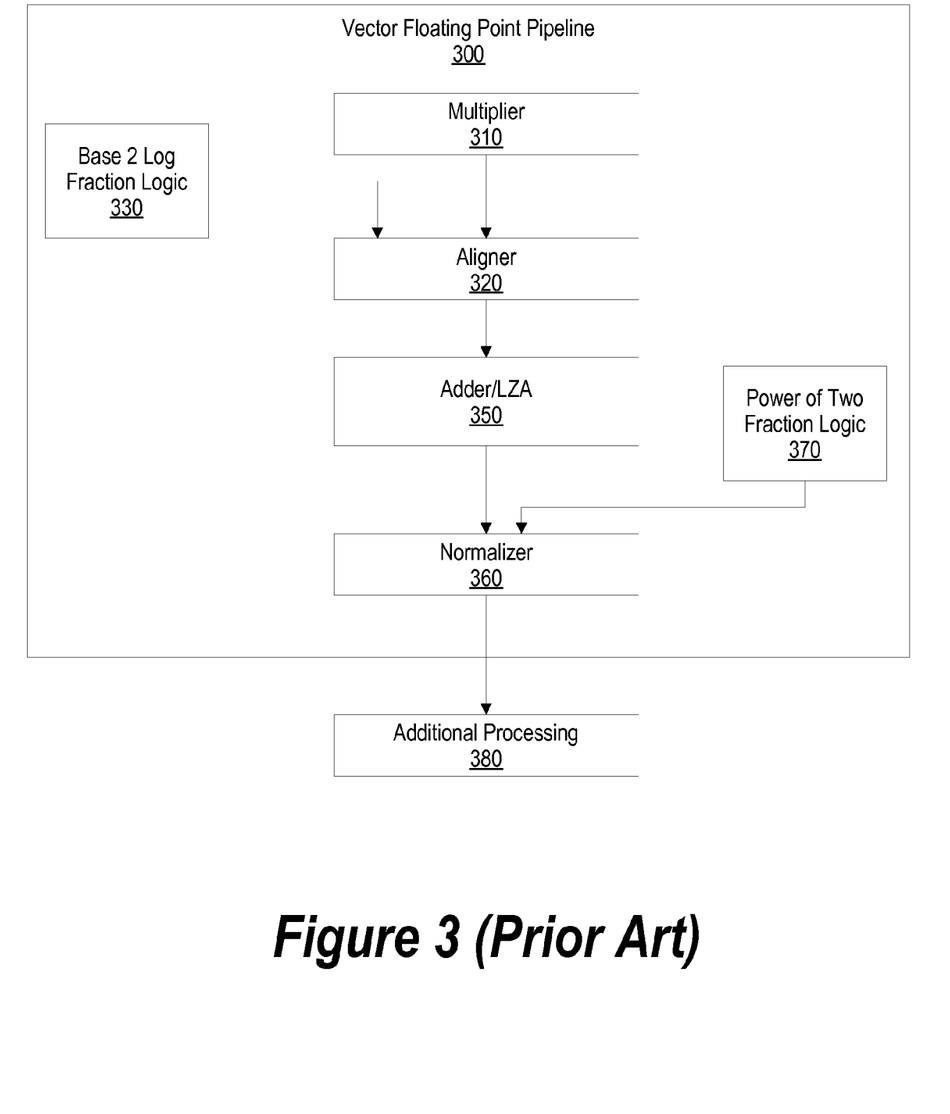
FIG. 3 is a diagram showing common components of a vector floating point pipeline that is typically used to perform an intensity result computation using three separate microprocessor instructions.

FIG. 3 is a diagram showing common components of a vector floating point pipeline that is typically used to perform an intensity result computation using three separate microprocessor instructions, which are a base 2 logarithm instruction, a multiply-add instruction, and a power of 2 exponentiation instruction. A vector floating point pipeline of this sort typically has common components to facilitate log, power, multiply, and add instructions. FIG. 3 shows a simplified pseudo floor plan of one slice of such a pipeline.

Vector floating point pipeline 300 includes components 310 through 370. For each of the three instructions that are used during a specular highlight calculation, a significant portion of the vector floating point pipeline 300 is unused. The base 2 log instruction completes its result very quickly using base 2 log fraction logic 330, and passes through adder/leading zero anticipator (LZA) 350 without any changes. The multiply-add instruction uses multiplier 310, but only adds a zero. Therefore, the add step is unnecessary for this instruction. The power of two instruction performs its fraction calculation near the end of the pipe using power of two fraction logic 370 since it requires the integer and fraction portions from aligner 320. The time that would normally be spent performing a multiply in other instructions is wasted with a power of two instruction. Normalizer 360 normalizes results that it receives and sends the normalized results to additional processing 380. As will be discussed in the text corresponding to FIGS. 4 through 6, the invention described herein does not require a full normalize step.

Another issue with using three separate microprocessor instructions to compute an intensity value is that of register dependency. With a series of instructions, the result of the first instruction must be present before the second instruction starts, and the result of the second instruction must be present before the third instruction starts. In other words, the instructions must be executed in proper order, and their target registers cannot be overwritten between instructions. In some computer architectures, new instructions will stall until a result with a dependency is completed, which may have a significant impact on performance.

Figure 4A:
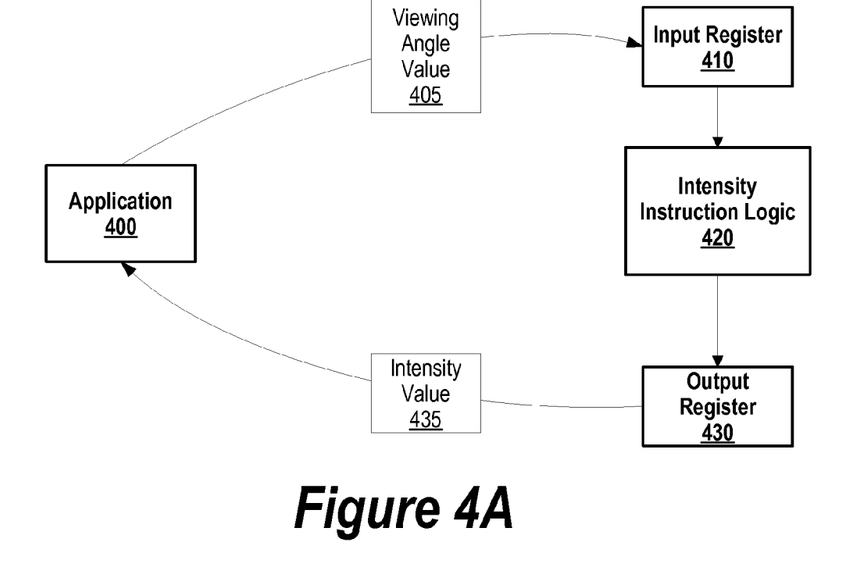
FIG. 4A is a diagram showing an application using a single instruction to calculate an intensity result that is based upon a viewing angle cosine value.

FIG. 4A is a diagram showing an application using a single instruction to calculate an intensity value that is based upon a viewing angle value. Application 400 calculates viewing angle cosine value 405 using an approach that is known in the art. For example, one method to compute a viewing angle cosine value is to compute a reflection ray from a light source, bouncing the reflection ray off of a subject point on a surface, and then computing a $\cos(\theta)$ as a dot product of that reflection ray and the ray from the subject point to a viewing position. In another example, which is quicker and more widely accepted in the industry, is to compute a "half-angle" ray, which is the sum of a normalized ray to a light source plus a normalized ray to a viewing position. In this example, the dot product is computed between the half-angle ray and the normal to a surface point on an object. The dot product is the calculated viewing angle cosine value. As one skilled in the art can appreciate, inputs to dot products are vectors of unit length. As those skilled in the art may also appreciate, the viewing angle value may be a viewing angle cosine value, or other values that correspond to the relationship between a light source, an object, and a viewing position.

Application 400 then stores viewing angle cosine value 405 into input register 410. Using PowerPC™ assembly and VMX™ or Altivec™ instructions, intensity instruction logic 420 may be represented as a "vspecefp" instruction, which stands for a "vector specular estimate floating point" instruction.

Intensity instruction logic 420 represents a single microprocessor instruction. Intensity instruction logic 420 retrieves the viewing angle cosine value from input register 410, and computes an intensity value using the viewing angle cosine value and a surface property value that corresponds to the surface property of an object (see FIGS. 4B, 5, and corresponding text for further details regarding intensity value computations using a single instruction).

Intensity instruction logic 420 stores the computed intensity value in output register 430. Application 400 retrieves intensity value 435 from output register 430, and uses intensity value 435 to generate highlights for the object. Application 400 may continue to provide viewing angle cosine values that are based on different positions on the object to intensity instruction logic 420 in order to receive intensity values for the different positions on the object.

Figure 4B:
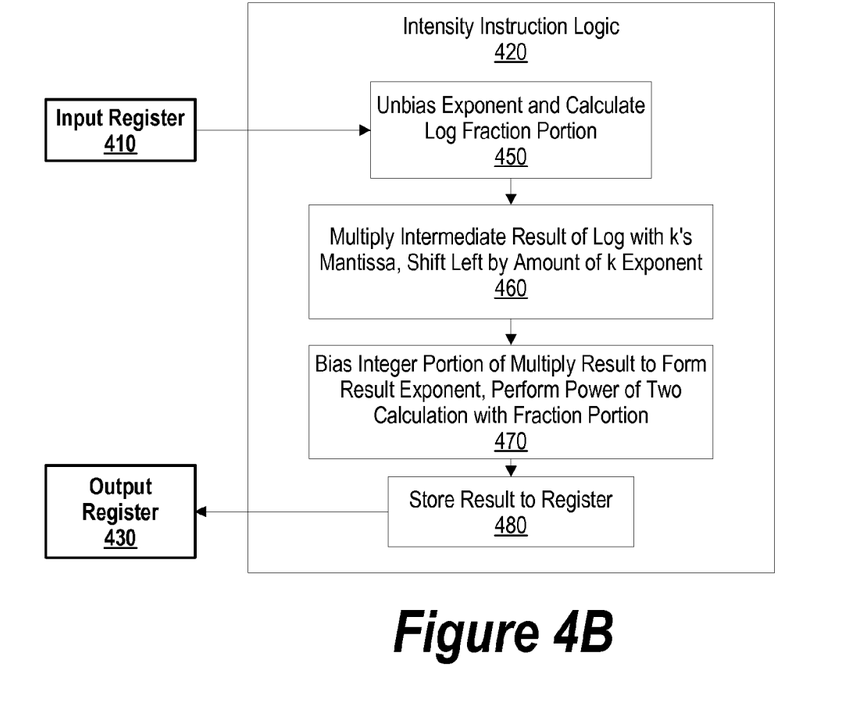
FIG. 4B is a diagram showing steps that are included in a single instruction for computing an intensity result based upon a viewing angle cosine value.

FIG. 4B is a diagram showing steps that are included in a single microprocessor instruction for computing an intensity result based upon a viewing angle cosine value. Intensity instruction logic 420 is the same as that shown in FIG. 4A, and includes four steps, which are steps 450 through 480.

At step 450, intensity instruction logic 420 retrieves a viewing angle cosine value from input register 410, subtracts out a bias from the viewing angle cosine value's exponent, calculates a log of the viewing angle cosine value's fractional portion using a look-up table, and combines the unbiased exponent and the log fraction value. Input register 410 is the same as that shown in FIG. 4A.

At step 460, intensity instruction logic 420 multiplies the combined result from step 450 with a surface property mantissa, and shifts the result to the left by the amount of the surface property exponent. At step 470, intensity instruction logic 420 rebiases the integer portion of the result from step 460, performs a power of 2 calculation with the fractional portion of step 460's result, and combines the biased integer with the power of 2 calculated fraction. This combination is then stored in output register 430 at step 480 (see FIG. 5 and corresponding text for further details regarding intensity instruction logic steps). Output register 430 is the same as that shown in FIG. 4A.

When comparing intensity instruction logic 420 with the three microprocessor instructions shown in FIG. 2, it can be seen that several steps that are included in FIG. 2 are not required in the single instruction shown in FIG. 4B. The normalize step in FIG. 2 (step 210) after the log calculation is not required since the multiply step is able to handle unnormalized inputs.

In addition, the full normalize step in FIG. 2 (step 240) after the multiply step is not required since the power of two operation requires that the mantissa is separated into an integer portion and a fractional portion. This is performed by a simple shift by the amount of the k exponent, which is far less complicated than a full width normalize.

Furthermore, there is no need to perform an add step as shown in FIG. 2 (step 240) since "zero" is typically the number that is added during an intensity value computation.

And finally, there is no need to store the intermediate results between instructions in a register as shown in FIG. 2 (steps 215 and 245) since FIG. 4B is a single microprocessor instruction.

Figure 5:
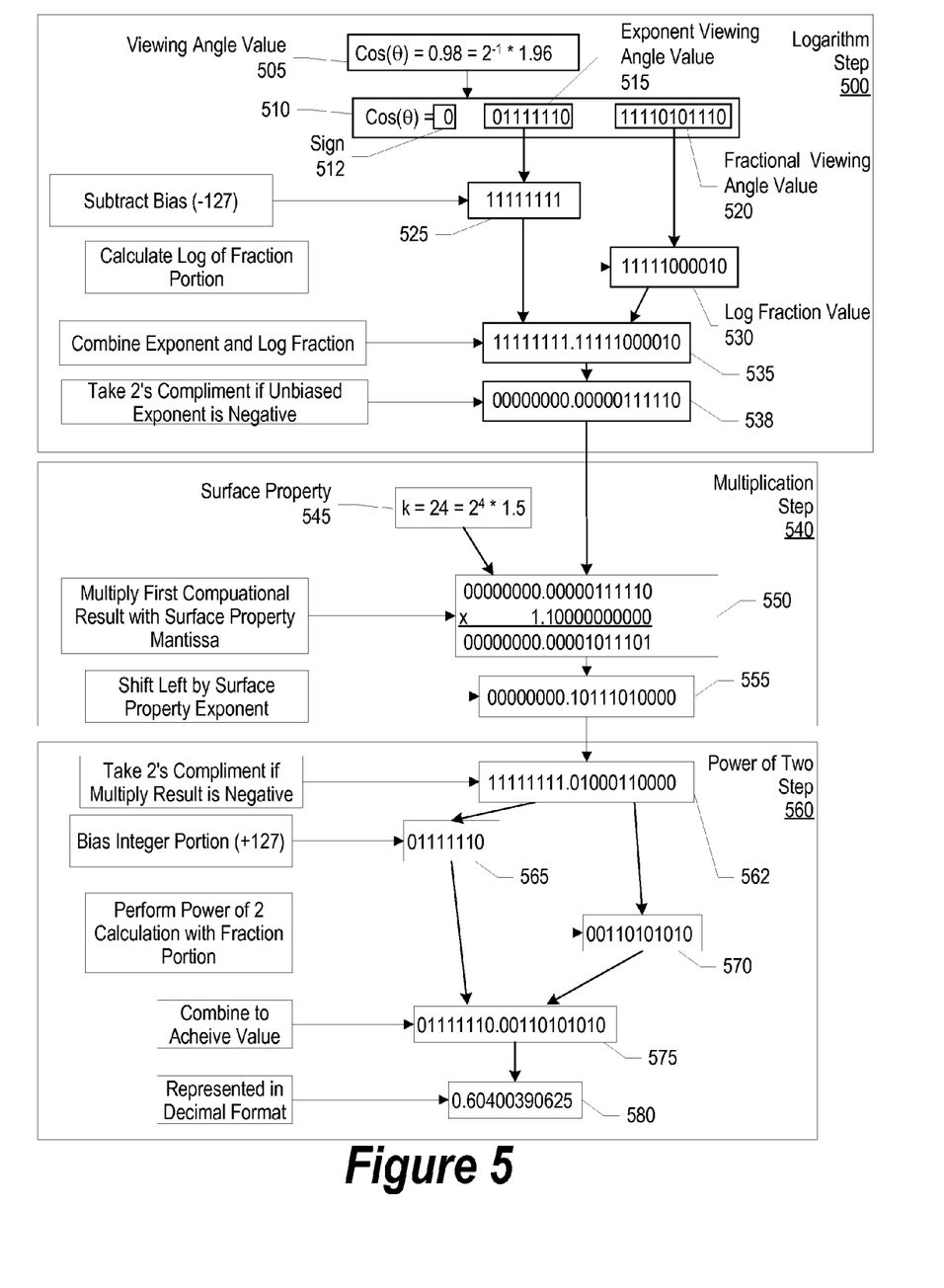
FIG. 5 shows an illustration of generating an intensity result based upon a viewing angle cosine value using a single instruction command.

FIG. 5 shows an example of generating an intensity result based upon a viewing angle cosine value using a single instruction command. FIG. 5 includes logarithm step 500, multiplication step 540, and power of two step 560, which correspond to steps 450, 460, and 470, respectively, that are shown in FIG. 4B.

Logarithm step 500 shows viewing angle cosine value 505, which, when represented in IEEE754 floating point format, equates to the number shown in box 510. Box 510 includes sign 512, exponent viewing angle cosine value 515, and fractional viewing angle cosine value 520. Logarithm step 500 unbiases exponent viewing angle cosine value 515 by subtracting the bias (127 in this example), which results in the value shown in box 525. In addition, logarithm step 500 calculates a log base 2 value of fractional viewing angle cosine value 520 using combinational logic and an adder. The result of the log base 2 calculation is log fraction value 530. Logarithm step 500 combines the value of box 525 with log fraction value 530, which results in the value that is shown in box 535. Since the unbiased exponent in box 535 is negative, a two's compliment is performed on the value of box 535, resulting in the value shown in box 538.

Multiplication step 540 uses surface property 545 to continue the intensity value computation. Multiplication step 540 multiplies the value of box 538 with surface property 545's mantissa (box 550). The result of the multiplication is shifted left by surface property 545's exponent, and the shifted result is shown in box 555. As can be seen in the example shown in FIG. 5, the multiplication result is shifted left four places to correspond to surface property 545's exponent of "4."

Since the result of multiplication step 540 is negative, power of two step 560 performs a two's compliment on the value of box 555, resulting in the value shown in box 562. Power of two step 560 also adds in the bias to the integer portion of the value in box 562 that was removed in log fraction 500. The rebiased result is shown in box 565. Power of two step 560 performs a power of two calculation with the fractional portion of the result in box 555, whereby the calculated result is shown in box 570. Power of two step 560 combines the result of box 565 with the result of box 570 in order to reach an intensity value that is represented in IEEE754 floating-point format (box 575). Box 580 shows the intensity value in box 575 in decimal format.

Figure 6:
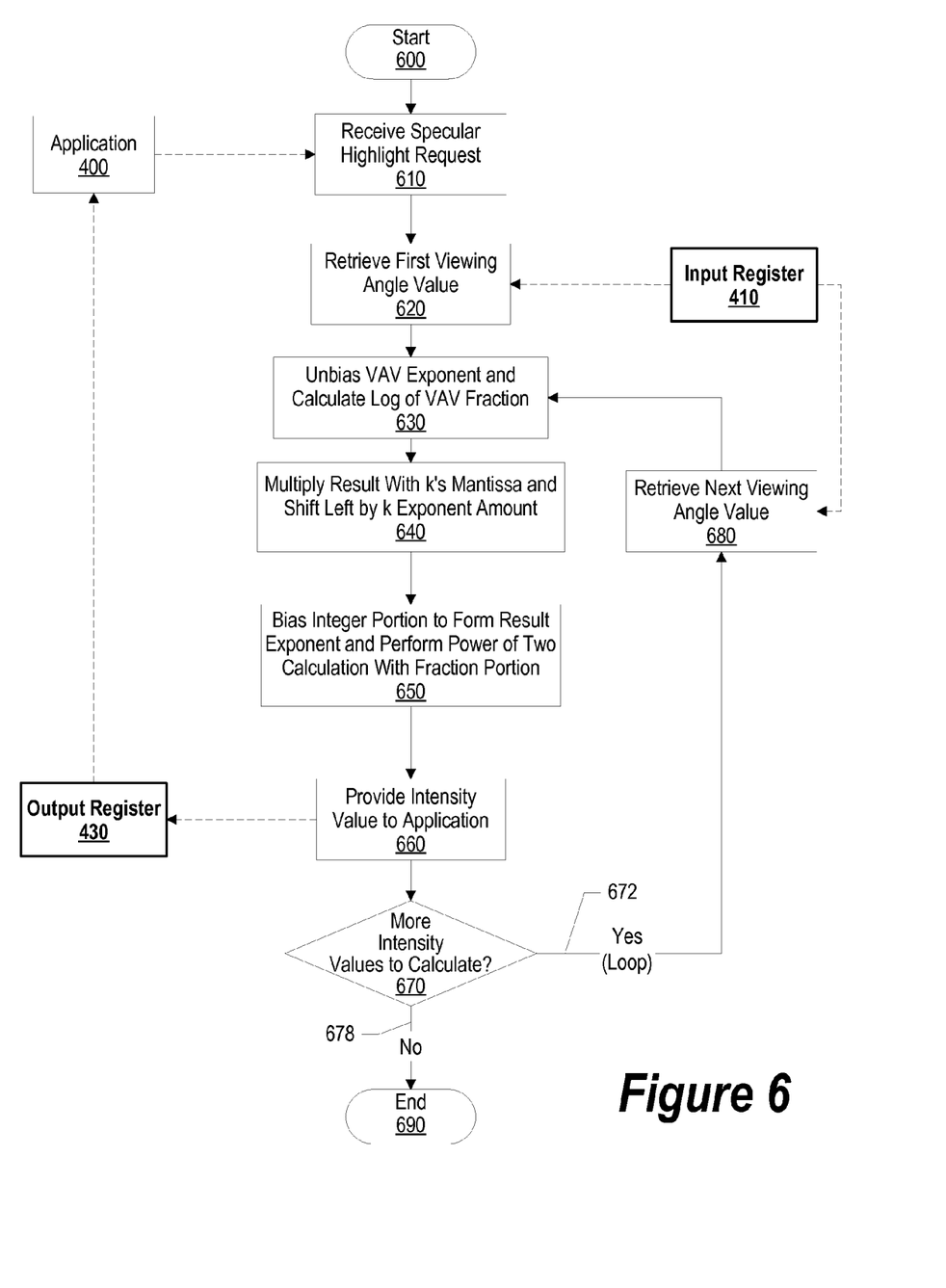
FIG. 6 is a flowchart showing steps taken in generating an intensity result in a non-hardware environment, such as in software or firmware.

FIG. 6 is a flowchart showing steps taken in generating an intensity result in a non-hardware environment, such as in software or firmware. Processing commences at 600, whereupon processing receives a specular highlight request from application 400 at step 610. Application 400 is the same as that shown in FIG. 4.

Processing receives a first viewing angle cosine value from input register 410 at step 620. Application 400 previously stored the viewing angle cosine value in input register 410. In one embodiment, processing may receive the viewing angle cosine value directly from application 400. Input register 410 is the same as that shown in FIG. 4. At step 630, processing unbiases the viewing angle cosine value exponent and calculates a log base 2 value of the viewing angle cosine value's fractional portion.

Processing multiplies the result of step 630 with a surface property value mantissa, and shifts the result left by an amount equal to the surface property value's exponent (step 640). For example, if the surface property integer portion is $2^5$, processing shifts the result left "5" spaces. At step 650, processing rebiases the integer portion of step 640's result and performs a power of two calculation with the fractional portion of step 640's result. The combined biased integer and the calculated fraction result is the intensity value.

Processing stores the intensity value in output register 430, whereby application 400 is able to retrieve (step 660). In one embodiment, processing provides the intensity value directly to application 400.

A determination is made as to whether there are more intensity values to calculate (decision 670). If there are more intensity values to calculate, decision 670 branches to "Yes" branch 672 which loops back to retrieve (step 680) and process the next viewing angle cosine value. This looping continues until there are no more intensity values to calculate, at which point decision 670 branches to "No" branch 678 whereupon processing ends at 690.

Figure 7:
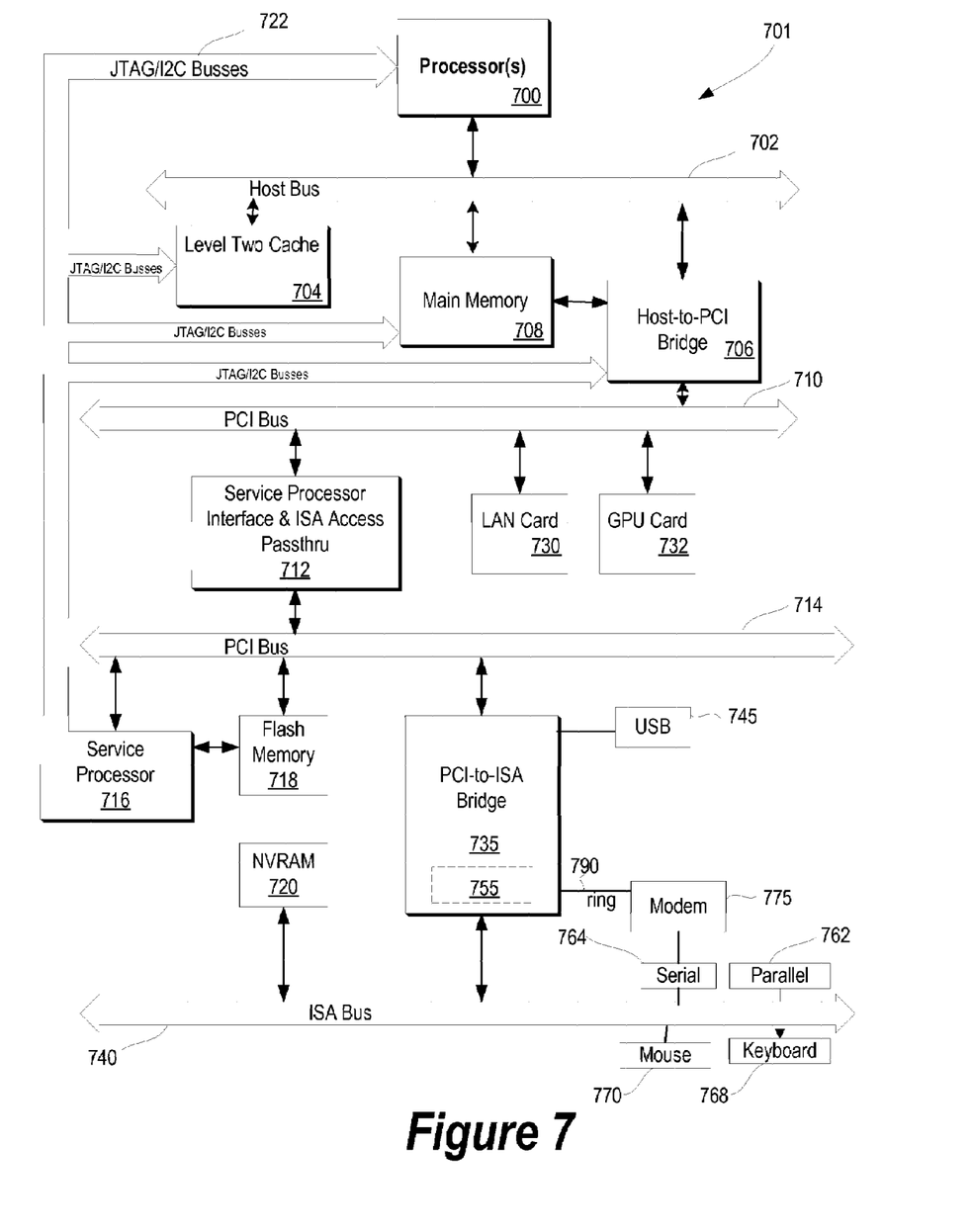
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730 and Graphics Processing Unit (GPU) card 732 are coupled to PCI bus 710. In one embodiment, GPU card 732 is coupled to host bus 702. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

Figure 8:
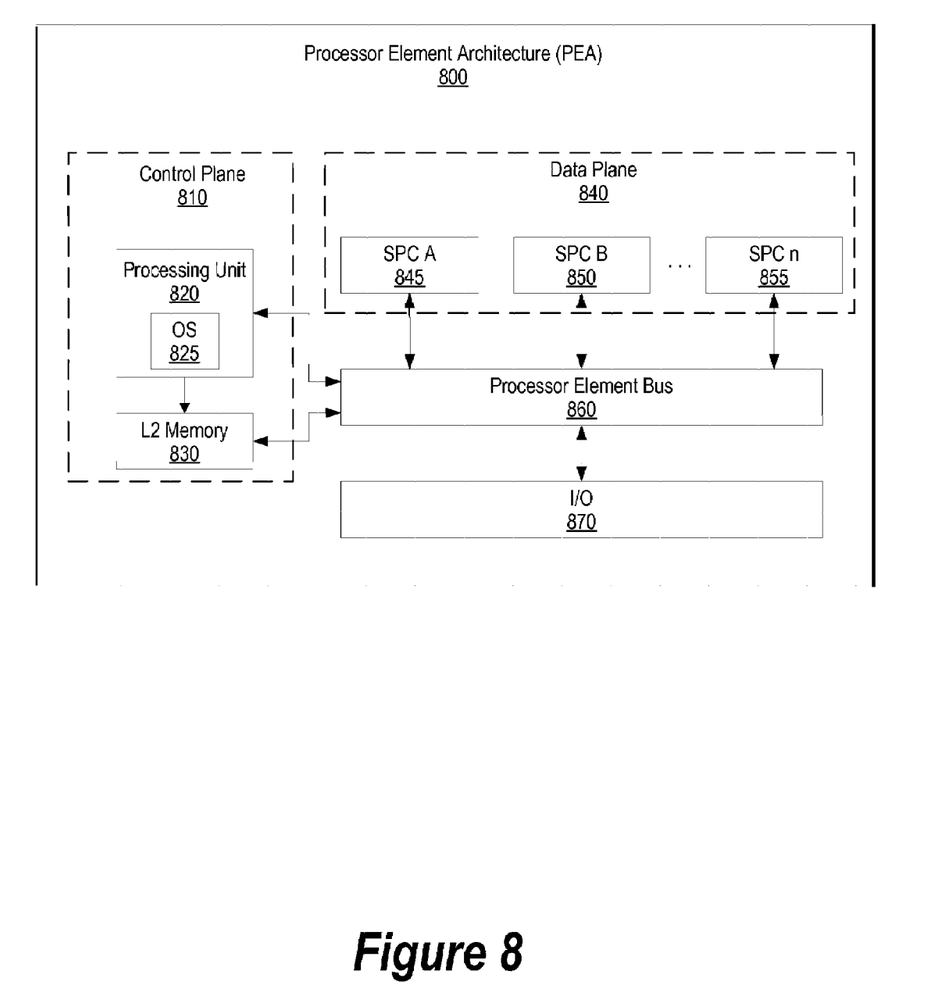
FIG. 8 a block diagram of a second computing device capable of implementing the present invention.

FIG. 8 illustrates a second information handling system that is a simplified example of a computer system capable of performing the computing operations described herein. The example in FIG. 8 shows a plurality of heterogeneous processors using a common memory map in order to share memory between the heterogeneous processors. Processor element architecture (PEA) 800 sends and receives information to/from external devices through input output 870, and distributes the information to control plane 810 and data plane 840 using processor element bus 860. Control plane 810 manages PEA 800 and distributes work to data plane 840.

Control plane 810 includes processing unit 820, which runs operating system (OS) 825. For example, processing unit 820 may be a Power PC core that is embedded in PEA 800 and OS 825 may be a Linux operating system. Processing unit 820 manages a common memory map table for PEA 800. The memory map table corresponds to memory locations included in PEA 800, such as L2 memory 830 as well as non-private memory included in data plane 840.

Data plane 840 includes Synergistic Processing Complex's (SPC) 845, 850, and 855. Each SPC is used to process data information and each SPC may have different instruction sets. For example, PEA 800 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU), which is a processing core, such as a digital signal processor, a microcontroller, a microprocessor, or a combination of these cores.

SPC 845, 850, and 855 are connected to processor element bus 860 which passes information between control plane 810, data plane 840, and input/output 870. Bus 860 is an on-chip coherent multi-processor bus that passes information between I/O 870, control plane 810, and data plane 840. Input/output 870 includes flexible input-output logic which dynamically assigns interface pins to input output controllers based upon peripheral devices that are connected to PEA 800. For example, PEA 800 may be connected to two peripheral devices, such as peripheral A and peripheral B, whereby each peripheral connects to a particular number of input and output pins on PEA 800. In this example, the flexible input-output logic is configured to route PEA 800's external input and output pins that are connected to peripheral A to a first input output controller and route PEA 800's external input and output pins that are connected to peripheral B to a second input output controller.

While the computer systems described in FIGS. 7 and 8 are capable of executing the processes described herein, the computer systems are simply two examples of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    retrieving a viewing angle value;
    calculating, using a processor, an intensity value based upon the viewing angle value using a single instruction command, wherein the single instruction command includes a multiplication step that further includes:
        retrieving a surface property value that includes a surface property mantissa and a surface property exponent;
        multiplying an unbiased exponent viewing angle value and a log fraction value with the surface property mantissa; and
        shifting the multiplication result by an amount that corresponds to the surface property exponent;
    storing the intensity value; and
    utilizing the intensity value during object highlight generation.

2. The method of claim 1 wherein the viewing angle value includes a biased exponent viewing angle value and a fractional viewing angle value, and the single instruction includes a logarithm step and a power of two step.

3. The method of claim 2 wherein the logarithm step further comprises:
    unbiasing the biased exponent viewing angle value, resulting in the unbiased exponent viewing angle; and
    calculating the log fraction value using the fractional viewing angle value.

4. The method of claim 1 wherein the single instruction command corresponds to a single operation that performs a mathematical computation using the viewing angle value and the surface property value.

5. The method of claim 1 wherein the power of two step further comprises:

biasing an integer portion of the shifted multiplication result; and performing a power of two calculation with a fractional portion of the shifted multiplication result.

6. The method of claim 1 further comprising:

retrieving the viewing angle value from an input register, wherein an application is adapted to store the viewing angle value in the input register; and storing the intensity value in an output register, wherein the application is adapted to retrieve the intensity value from the output register.

7. The method of claim 1 wherein the single instruction includes single instruction multiple data floating point properties.

8. The method of claim 1 wherein the viewing angle value is a viewing angle cosine value.

9. The method of claim 1 wherein the single instruction is performed using a processing element architecture.

\* \* \* \* \*